Sept. 6, 1932.    P. DUNCAN    1,875,574
VALVE
Filed April 27, 1931
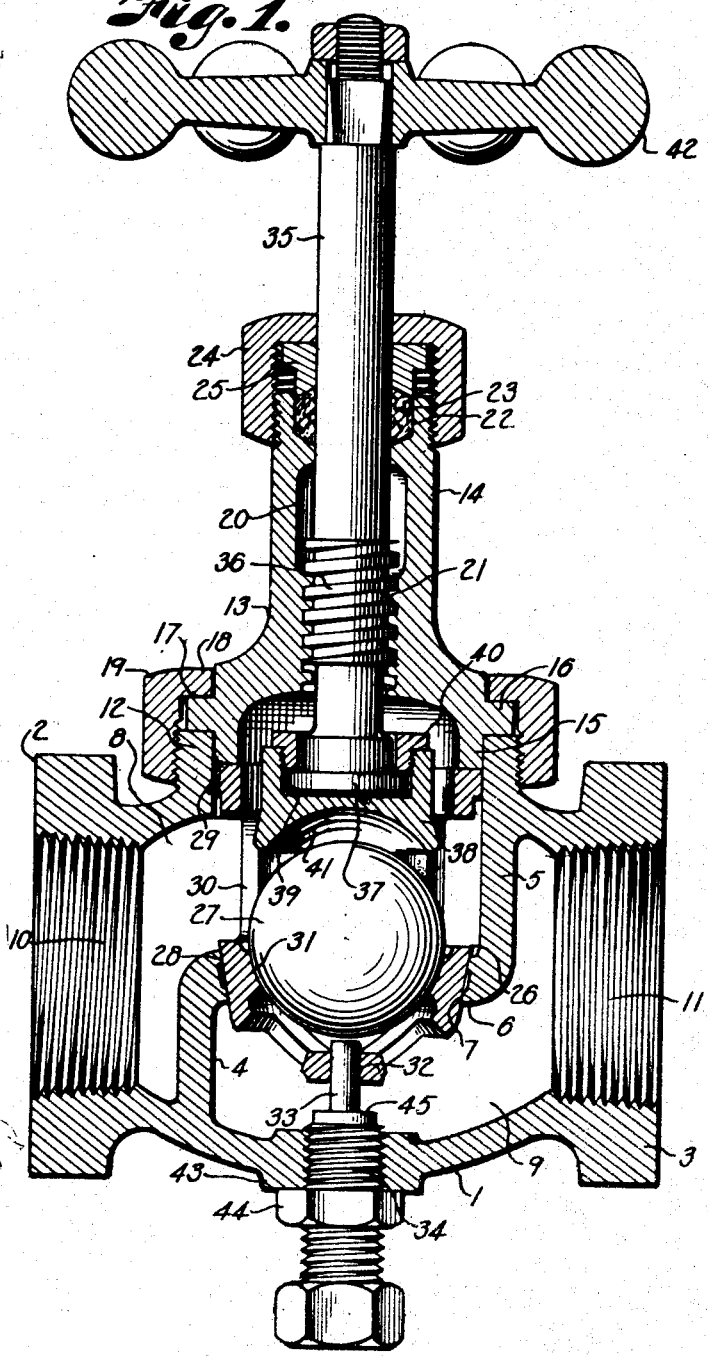
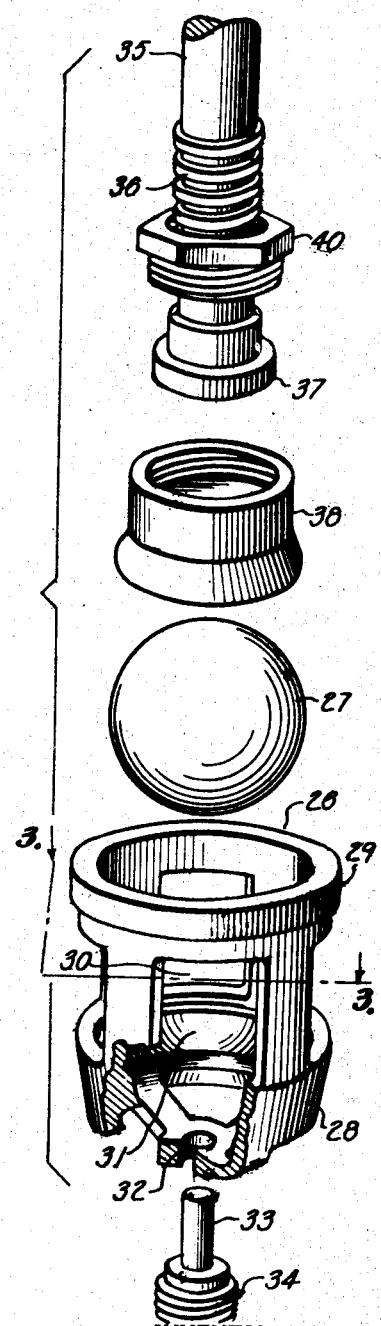
INVENTOR.
Patrick Duncan,
BY
Arthur C. Brown
ATTORNEY.

Patented Sept. 6, 1932

1,875,574

UNITED STATES PATENT OFFICE

PATRICK DUNCAN, OF OKLAHOMA CITY, OKLAHOMA

VALVE

Application filed April 27, 1931. Serial No. 533,075.

This invention relates to valves and more particularly to a combination hand and check valve, the principal objects of the invention being to provide a removable and replaceable seat for a valve check, to provide means carried by the valve for aiding in removal of the seat, and to provide for adjusting closure of the check to control back flow through the valve.

It is also an object of the invention to provide a valve in which flow may be controlled in either direction.

In accomplishing these and other objects of the invention, I have provided improved details of structure, the preferred form of which is illustrated in the accompanying drawing, wherein:

Fig. 1 is a vertical longitudinal sectional view through a valve constructed in accordance with my invention.

Fig. 2 is a detail perspective view of the valve parts shown in related spaced position.

Fig. 3 is a horizontal section through the valve guide member on the line 3—3, Fig. 2.

Referring more in detail to the drawing:

1 designates a valve body having oppositely positioned internally threaded necks 2 and 3 by which the valve body may be connected between pipe sections of a flow line, not shown.

Extending across the interior of the valve body is a partition consisting of spaced vertical webs 4 and 5 connected by a horizontal web 6 having a vertically tapered opening 7 positioned concentrically of the valve body. The partition thus separates the interior of the valve body into individual fluid-receiving chambers 8 and 9 communicating through ports 10 and 11 with the threaded necks 2 and 3.

Formed on the upper part of the body concentrically with the tapered opening 7 is an externally threaded neck 12 for supporting a valve bonnet 13. The bonnet 13 comprises a stem or guide portion 14 and an enlarged cylindrical base portion 15 of suitable diameter to be received within the neck 12 and having an annular flange 16 for seating against the upper face of the neck 12. The flange 16 also provides an annular shoulder 17 engaged by an inwardly extending flange 18 on a retaining ring 19 that is threaded on the neck 12 to retain the bonnet as in standard valve construction.

The stem guide is provided with an internal bore 20 having threads 21 formed at the lower end thereof and a packing-receiving groove 22 in the upper end to receive a packing 23 that is compressed against the valve stem by the usual packing nut 24 and follower 25.

26 designates a removable valve seat and guide that is received in the tapered opening formed in the horizontal portion 6 of the partition and extends upwardly into the upper chamber 8 to retain and seat a ball valve 27 closing communication between the chambers 8 and 9.

The valve guide preferably comprises a cylindrical sleeve-like member having a tapered lower end 28 conforming to the taper of the opening 7 and an annularly extending collar 29 on its upper end for snugly engaging the inner wall of the neck 12 whereby the guide is centered in the opening and against which the bonnet engages to retain the guide in its tapered seat.

Formed in the periphery of the guide member intermediate the collar 29 and the tapered portion 28 is a plurality of ports 30 through which fluid may flow from the chamber 8 into the interior of the valve guide for passage through a valve seat 31, that is formed with the lower end of the guide at a point below the ports 30. The lower end of the guide is provided with a preferably integral spider having a central opening 32 for receiving a pilot 33 on an adjusting screw 34, later described. It is thus apparent that the ball valve 27 acts on the valve seat and operates in the guide to control communication between the chambers 8 and 9.

In order to retain the ball in sealing engagement on its seat and to shut off flow through the valve and to control the distance that the ball may rise from its seat, I provide the customary valve stem 35 which extends through the stem guide and is provided with a threaded portion 36 for engaging the threads formed in the bonnet previously described. The depending lower end of the stem depends into the valve guide and is provided with an annular flange 37 for swivelly mounting a head member 38.

The member 38 is provided with a recess 39 to receive the flange 37 and is retained thereon by a ring 40 sleeved on the stem and threaded into the recess to engage the upper face of the flange. The lower face of the member 38 is provided with a concave surface 41 conforming to the contour of the ball 27 for centering the ball on its seat.

The swivel mounting of the head is an important feature in that it is not necessary for the head to move over the polished surface of the ball 27 when the ball is moved to closed position.

The upper end of the valve stem extends outwardly through the packing nut 24 and is provided with the usual hand wheel or the like 42.

In order that the valve guide and seat may be readily forced from seating engagement with the tapered opening, I provide the adjusting screw 34, previously mentioned. The screw 34 is threadedly mounted in a boss 43 formed in the bottom of the valve body in axial alignment with the opening 32 and is provided with a lock nut 44 for engaging the under side of the boss to retain the adjusting screw in set position.

It is apparent that when the screw 43 is rotated in the valve body, the pilot 33 will engage and raise the ball 27 from its seat and the fluid may then flow through the valve from the chamber 8 through the valve guide into the chamber 9, the amount of flow, of course, depending upon the amount of opening of the ball valve which is controlled by the position of the head 38.

When the adjusting screw is threaded into the valve body so that a shoulder 45 formed by the reduced pilot 33 engages the lower end of the valve guide, the valve guide will be forced from its seat in order that it may be repaired or replaced.

When the parts of the valve, constructed as described, are to be assembled the valve guide is inserted through the neck 12 and its tapered end 28 is pressed into sealing engagement with the tapered wall of the opening 7. The valve stem carrying the head 38 is then threaded into the valve bonnet and the handwheel 42 applied to its upper end.

The bonnet 13 is then applied to the valve body and the threaded ring 19 is applied to the neck 12 so that the lower end 15 of the bonnet is retained thereby in engagement with the upper end of the valve guide to keep the valve guide in its seat.

The packing nut 24 is then tightened, compressing the packing 23 about the valve stem to prevent leakage through the bonnet. The adjusting screw 34 may then be inserted in the threaded boss 43 until the pilot 33 is received in the opening 32 or until the ball valve is raised above its seat to permit the desired flow through the valve.

The lock nut 44 is then tightened against the boss to retain the nut in adjusted position. The amount of opening of the valve may be controlled by manipulating the valve stem 36 to position the head in relation to the ball. The valve is then in condition to be used as an ordinary hand valve wherein fluid may flow either from the chamber 8 into the chamber 9 or from the chamber 9 into the chamber 8. Should it be desired to use the valve as a check valve, the lock nut on the adjusting screw will be loosened and the adjusting screw will be rotated reversely to allow the ball 27 to engage its seat. The flow from the chamber 8 will then be checked by the ball from flowing into the chamber 9, but fluid in the chamber 9 may raise the ball to flow into the chamber 8, the flow being dependent upon the amount of lift of the ball which is governed by the position of the head 38.

When the valve seat becomes worn and it is desired to replace the valve guide, the bonnet is removed and the adjusting screw 34 is threaded into the body until the shoulder 45 engages against the spider carried by the lower end of the valve guide, whereupon continued rotation of the screw will force the valve guide from its seat. It may then be readily removed from the upper end of the neck 12. After this operation the adjusting screw is reversely threaded from the valve body to permit a new valve seat to be inserted in the threaded opening of the partition, after which the adjusting screw may be positioned to permit proper opening of the ball 27, and the bonnet carrying the valve stem and head 38 is again applied to the valve body.

What I claim and desire to secure by Letters Patent is:

1. In a valve of the character described including a valve body, a partition in the body having a tapered opening, a valve seat member having a tapered periphery for sealing engagement with the tapered opening, and a screw member threaded into the valve body and adapted to engage said seat member for removing the seat member from the valve body.

2. In a valve of the character described including a valve body, a partition in the body having a tapered opening, a valve seat member having a tapered periphery for sealing engagement with the tapered opening, and means supported by the valve body and adapted to engage said seat member for removing the seat member from the valve body.

3. In a valve of the character described including a valve body, a partition in the body having an opening, a valve seat member having sealing engagement in the opening, a check member on the valve seat, a screw member threaded into the valve body and adapted to engage said seat member for removing the seat member from the valve body, and a pilot member on the screw for raising the check member from the seat member.

4. In a valve of the character described including a valve body, a partition in the body having a tapered opening, a valve seat member having a tapered periphery for sealing engagement with the tapered opening, a guide member on the seat member, a ball valve operable in the guide member and having engagement with the seat member, and a screw member threaded into the valve body and adapted to engage said seat member for removing the seat member from the valve body.

5. In a valve of the character described including a valve body, a partition in the body having a tapered opening, a valve seat member having a tapered periphery for sealing engagement with the tapered opening, a valve bonnet for the body member engaging the seat member to retain the seat member in the tapered opening, and a screw member threaded into the valve body and adapted to engage said seat member for removing the seat member from the valve body.

6. In a valve of the character described including a valve body, a partition in the body having a tapered opening, a valve seat member having a tapered periphery for sealing engagement with the tapered opening, a spider on the seat member and a screw member threaded into the valve body and adapted to engage said spider to remove the seat member from the valve body.

In testimony whereof I affix my signature.

PATRICK DUNCAN.